United States Patent [19]
O'Sullivan et al.

[11] Patent Number: 5,057,954
[45] Date of Patent: Oct. 15, 1991

[54] DISK DRIVE HEAD LIFT MECHANISM

[75] Inventors: William O'Sullivan, Milpitas, Calif.; Robert D. Freeman, Erie, Colo.

[73] Assignee: Maxtor Corporation, San Jose, Calif.

[21] Appl. No.: 310,292

[22] Filed: Feb. 13, 1989

[51] Int. Cl.⁵ .................................. G11B 5/54
[52] U.S. Cl. ..................................... 360/105
[58] Field of Search ................... 360/105–106

[56] References Cited

U.S. PATENT DOCUMENTS

| | | | |
|---|---|---|---|
| 4,742,410 | 5/1988 | Smith | 360/105 |
| 4,829,396 | 5/1989 | Okutsu | 360/105 |
| 4,884,261 | 11/1989 | Dalziel | 360/105 |

Primary Examiner—A. J. Heinz
Attorney, Agent, or Firm—Hecker & Harriman

[57] ABSTRACT

A head loading mechanism for a disk drive. When power to the disk drive is disconnected, an actuating spring is released. Movement of the spring causes a plunger to contact a bracket on the actuator arm, moving the actuator arm over a parking zone. Further movement of the spring causes blades to lift read/write heads mounted on the actuator arm away from disk surfaces. When power is restored, a motor compresses the spring and returns the plunger and the blades to their original positions.

31 Claims, 3 Drawing Sheets

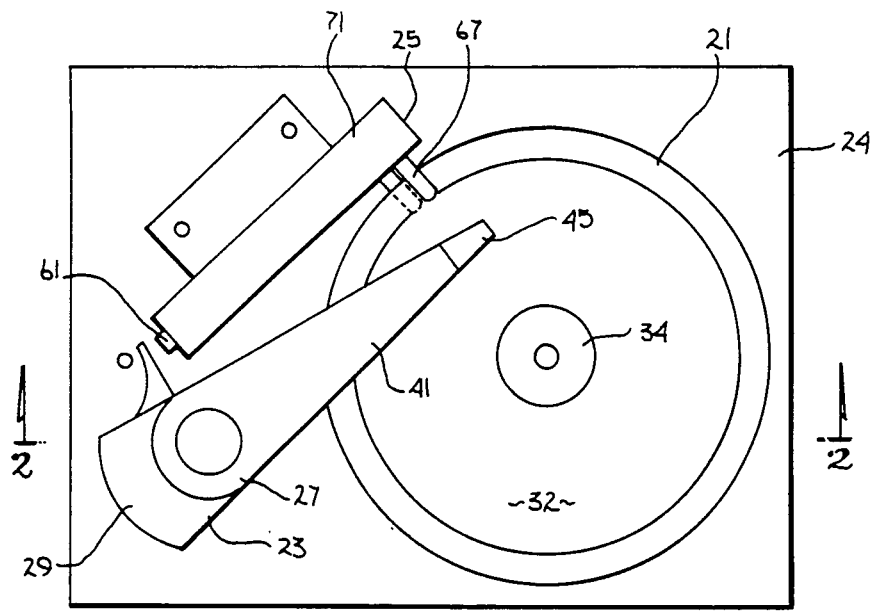
_Fig. 1_
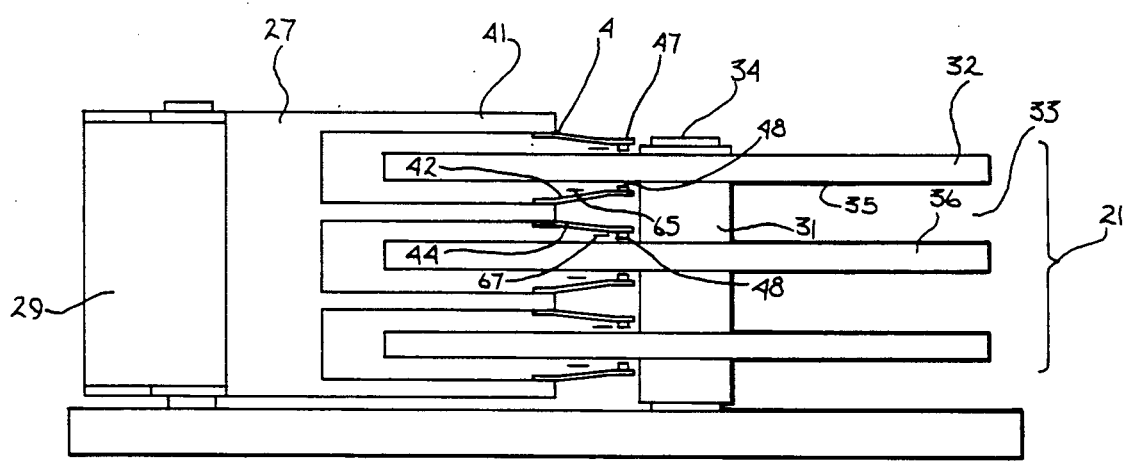
_Fig. 2_

DISK DRIVE HEAD LIFT MECHANISM

BACKGROUND OF THE PRESENT INVENTION

1. Field of the Invention

This invention relates to the field of disk drives and more particularly to an automatic mechanism for loading a read/write head onto and unloading it from a disk surface.

2. Background

Hard disk drives typically use one or more aluminum disks to store computer data. These disks are covered with a magnetic coating that can be selectively magnetized and demagnetized. Data is written to or read from the disk by means of a magnetic read/write head.

During the normal operation, the disks spin at a high rate, typically 3600 rpm. The magnetic read/write heads are positioned in close proximity to the disks but do not contact the disk surfaces. Instead, the heads "float" on a layer of air, called an "air bearing", produced by the aerodynamic action of the spinning disks. This air bearing is very thin. During normal operation, the heads are typically within 10 microinches of the disk surfaces.

Magnetic heads are commonly mounted on a pivoting actuator arm. The actuator arm moves the heads in an arc across the disk surfaces, much like the tone arm of a record player. Since there are no grooves in the magnetic disks to guide the actuator arm, a servo motor is used to pivot the arm. To minimize the amount of energy required to move the arm, the arm must be kept as light as possible. A low arm weight also increases the speed at which the heads can be moved across the disks, and consequently increases the rate at which data head can be positioned over a desired track.

For proper operation of the disk drive, the magnetic heads must not be allowed to contact the disk surfaces. Head disk contact can cause damage to the disk's magnetic coating and a loss of stored data. Physical damage to the magnetic heads may also occur. Damage to a disk or head may make the disk drive inoperative, requiring inconvenient and expensive disassembly and repair.

If a power failure occurs or power to the disk drive is interrupted for any other reason, the disks cease spinning and come to a stop. As the disks stop spinning, the air bearings supporting the magnetic heads dissipate. If the heads are not otherwise supported, they will contact the disk.

Some prior art disk drives have tried to alleviate the effects of a head disk contact by using "parking zones" throughout. A parking zone is an area on the magnetic disk that does not contain any stored data. When power is disconnected to these prior art disk drives, the actuator arm is automatically driven over the parking zone and the heads are allowed to contact the disk as the air bearing dissipates. Because the parking zone does not contain any data, no data is lost because of the head to disk contact. However, physical damage to the heads may still occur and debris may be generated in the drive.

The methods used in these prior art disk drives to move the actuator arm towards the parking zone have adverse effects on the disk drive's cost and performance. In some prior art disk drives the driving mechanism is located directly on the arm. The added weight increases the energy required to move the arm and decreases the speed at which the arm can be moved. In other prior art drives, the residual EMF in the spindle motor coils is used to drive the arm to the parking zone. This method requires complex electronic circuitry that adds to the cost of the disk drive.

The present invention overcomes the limitations of the prior art by providing a means to automatically move the actuator arm to the parking zone without allowing the head to contact the disk, without adding to the weight of the actuator arm, and without requiring complex electronic circuitry.

BRIEF DESCRIPTION OF THE DRAWINGS

FIG. 1 is a top view showing the major components of a disk drive incorporating the present invention.

FIG. 2 is a front sectional view along line 2—2 in FIG. 1.

DETAILED DESCRIPTION OF THE INVENTION

Figure 3:
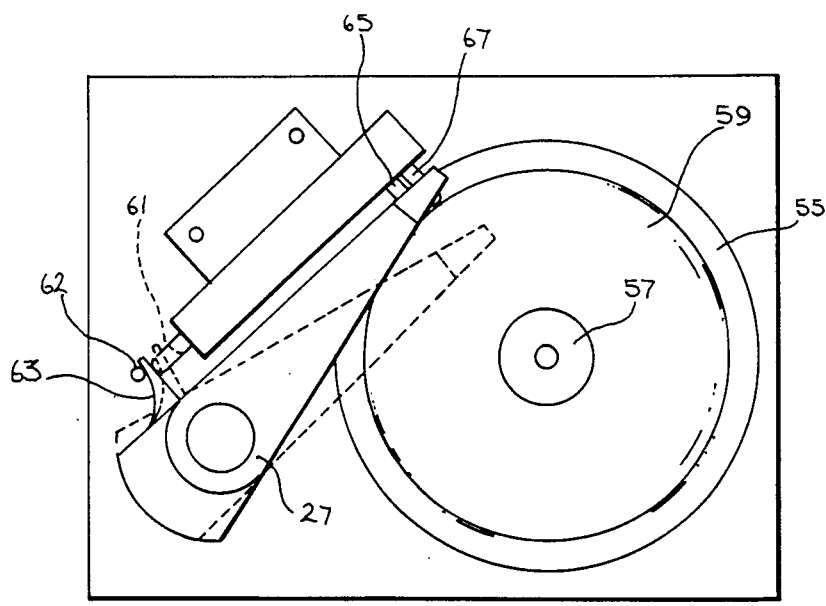
FIG. 3 is a top view of the disk drive of FIG. 1 illustrating the movement of the actuator arm towards the parking zone.

A head-lift mechanism for a disk drive is presented. In the following description, some parts and components are described in detail to provide a thorough understanding of the present invention. Other, well-known components such as electrical motors, gears, and solenoids are not described in detail so as not to obscure the present invention unnecessarily.

FIGS. 1 and 2 illustrate a typical disk drive incorporating the head-lift mechanism of the present invention. The major components shown are a disk assembly 21, an actuator arm assembly 23, and a head-lift mechanism 25, all of which are mounted on base 24. The disk assembly comprises a stack of magnetic disks 32 mounted on a spindle 34. Spacers 31 are mounted between the disks to provide air gaps 33 between adjacent disks. The actuator arm assembly comprises an actuator arm 27 and an actuator motor 29. The actuator arm incorporates a plurality of cantilever sections 41, the free ends of which are movable into the air gaps between adjacent disks. Each cantilever section may be constructed as a separate element that is assembled to the actuator arm, or the cantilever sections may be integrally formed with the actuator arm. The actuator arm is pivotally mounted to the base and interacts such that the cantilever sections are movable into and out of the air gaps between the disks. The magnetic heads 47 are supported by flexures 45 that are attached to the free ends of the cantilever sections. The flexures bias the heads towards the disk surfaces but are sufficiently flexible to allow the heads to be supported by the air bearings produced by the spinning disk. In the disk drive shown in FIGS. 1 and 2, some cantilever sections support two magnetic heads. Upper head 46, supported by upper flexure 42, writes and reads data to and from the disk surface above the cantilever section. Lower head 48, supported by lower flexure 44, writes and reads data to and from the disk surface below the cantilever section. In this manner, data can be stored on both surfaces of each disk.

In the preferred embodiment, head-lift mechanism 25 comprises a housing 71, a plunger 61, and two sets of head lift blades, 65 and 67, respectively. There is an upper lift blade 65 for each lower disk surface and a lower lift blade 67 for each upper disk surface. The housing is mounted adjacent to the disk assembly such that the blades extend generally radially into the air spaces adjacent to the parking zones.

The position during normal operation of blades 65 and 67 in relation to an actuator arm cantilever section 41 and flexures 42 and 44 is shown in FIG. 2. During normal operation of the disk drive, the blades are positioned such that when the actuator arm is positioned in the parking zone, upper blade 65 is positioned below upper disk surface 35 and above upper flexure 42, and lower blade 67 is positioned above lower disk surface 35 and below lower flexure 44. This position of the blades will be referred to as the retracted position. In the retracted position, the blades do not contact either the disk surfaces or the flexures.

The operation of head-lift mechanism 25 is illustrated in FIGS. 3 through 6. Referring first to FIG. 3, during normal operation, the actuator arm 27 rotates within a small arc such that the heads remain positioned over the data storage area 59 of the disks—that is the area between hub 57 and parking band 55 on each disk surface. As will be explained below, as long as power is being supplied to the disk drive, plunger 61 and upper and lower blades 65 and 67 are maintained in their retracted positions against a resisting force, such as a spring. In the preferred embodiment, discussed in detail below, a solenoid is used to lock the plunger and the blades in their retracted positions.

If power to the disk drive is cut off, the solenoid or other locking device holding the plunger and blades in their retracted position is released. The plunger and blades are linked such that the plunger moves first, extending outwards from the housing. As the plunger extends, it interacts with bracket 63 of actuator arm 27, urging the arm towards the parking zone until the bracket hits actuator arm stop 162. The position of the plunger and actuator arm with the plunger extended is shown in FIG. 3, while the position of the plunger and actuator arm with the plunger retracted is shown in FIG. 1. When the actuator arm initially reaches this position, flexures 42 and 44 are positioned between blades 65 and 67.

Figure 4:
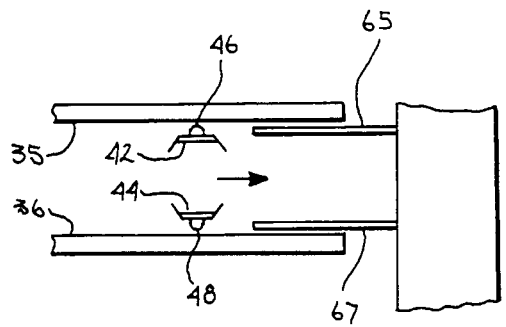
FIGS. 4, 5, and 6 are close-up, side views of the head lift mechanism of the present invention illustrating the operation of the movable blades.
Figure 5:
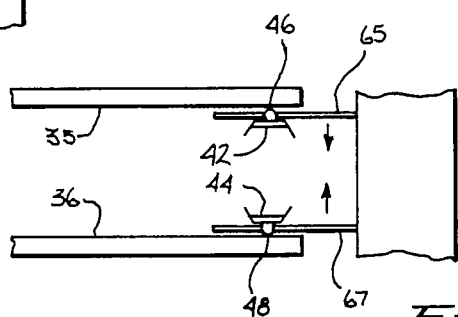
Figure 6:
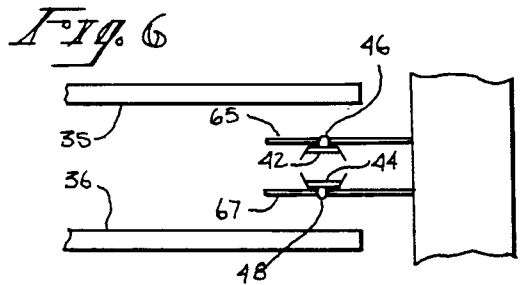

Turning next to FIGS. 4 to 6, after the actuator arm is positioned over the parking zone, the blades begin to move from the retracted position shown in FIGS. 4 and 5 to the extended position shown in FIG. 6. Blades 65 and 67 press flexures 42 and 44 between them, lifting heads 46 and 48 away from disk surfaces 35 and 36. When power to the disk drive is interrupted, the spinning disks slow down and eventually stop. The resisting forces acting on the plunger and blades are chosen such that the plunger positions the actuator arm over the parking zone and the blades lift the heads away from the disk surfaces before the air bearing has dissipated to the extent that head to disk contact can occur. No damage to the heads, or the disk surfaces, occurs.

Once power to the disk drive is restored, the above sequence is reversed. After the disk assembly motor is energized and the disks once again reach an acceptable operating speed, a retraction mechanism such as a hydraulic or pneumatic actuator or, preferably, and electric motor, returns the plunger and the blades to their retracted positions. First, the retraction mechanism moves the blades from their extended positions, shown in FIG. 6, to their retracted positions, shown in FIG. 5. After the blades have been fully retracted, a retraction mechanism retracts the plunger, allowing the actuator arm to swing away from the parking zone.

Figure 8:
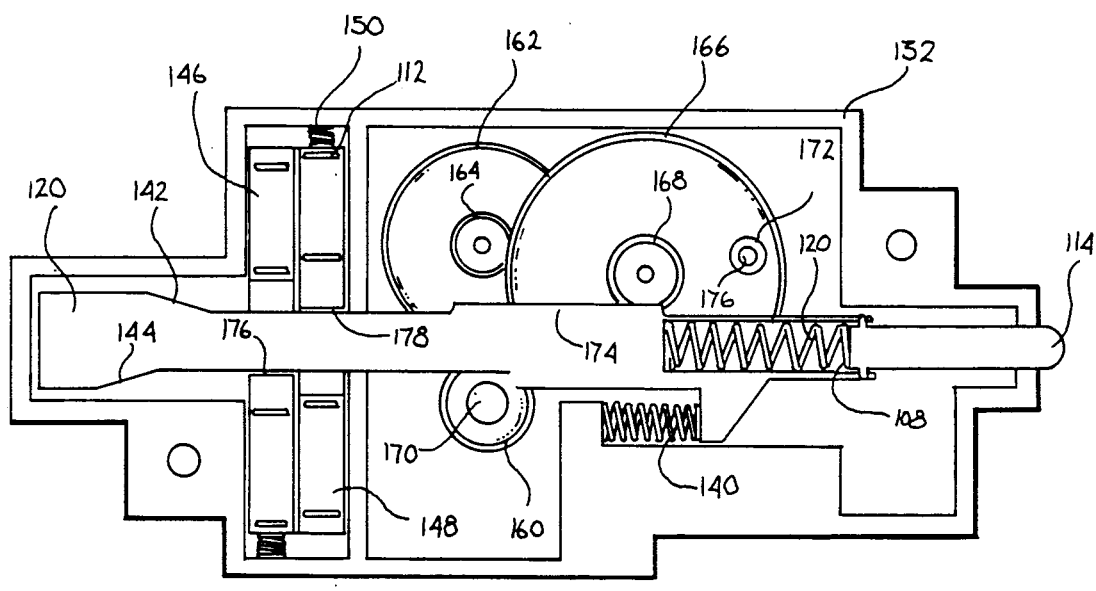
FIG. 8 is a front, sectional view along line 8—8 in FIG. 7.
Figure 7:
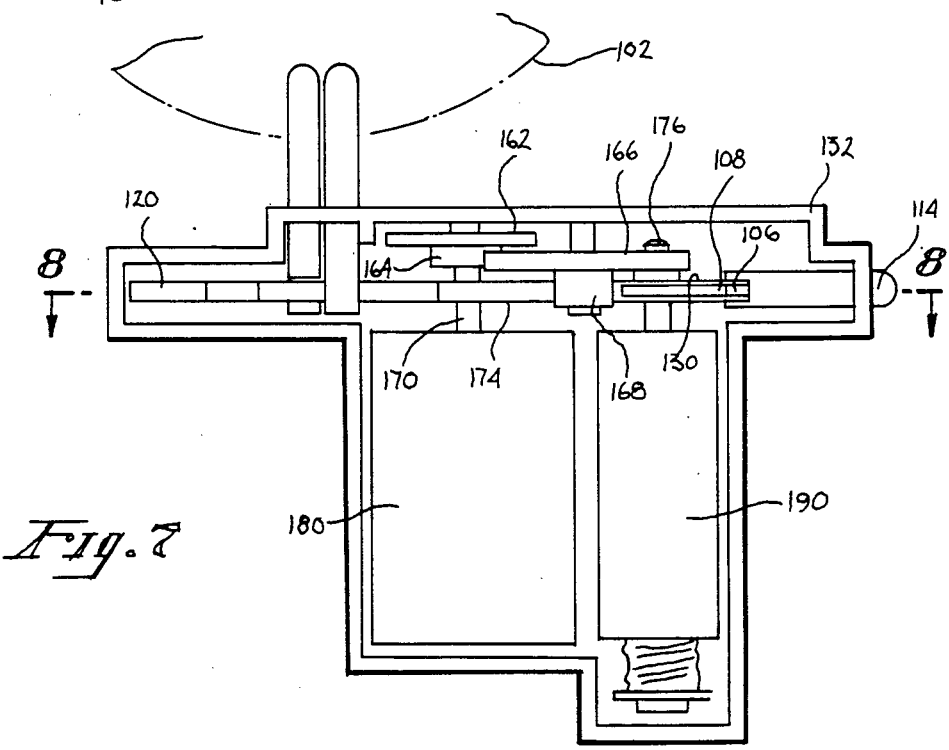
FIG. 7 is a top, cutaway view of the preferred embodiment of the present invention.

FIGS. 7 and 8 illustrate the preferred embodiment of the present invention, namely a head lift mechanism for a disk drive incorporating four stacked disks. FIG. 7 is a cutaway, top view of the mechanism. FIG. 8 is a side sectional view taken along line B—B in FIG. 7.

The head lift mechanism is located within a housing 132. In the preferred embodiment, the housing is formed from molded plastic. The housing contains all active elements of the mechanism. A movable rack 120 is mounted horizontally within the housing. A plunger 114 is slideably mounted in a bore 108 at one end of the rack. A plunger spring 130 biases the plunger towards its fully extended position, while a nub 106 retains the plunger in the bore. The tip of the plunger extends through a hole outside of the housing. When the rack is in its retracted position, illustrated in FIGS. 7 and 8, only the tip of the plunger extends outside the housing. When the rack is in its extended position, however, almost the entire plunger extends outside the housing.

As shown in FIG. 8, a power storage means in the form of an actuating spring 140 is located under the rack. The actuating spring biases the rack to the right, towards its extended position.

Still referring to FIG. 8, two cam surfaces 142 and 144 are located at the opposite end of the rack from the plunger. Cam surface 142 is located on the top, and cam surface 144 is formed on the bottom surface of the rack. The cam surfaces are staggered lengthwise along the rack. The cam surfaces engage cam follower surfaces on blade racks 146 and 148 as described below.

The two blade racks are located at the opposite end of the housing from the plunger. They are mounted vertically and are slideable up and down. Each blade rack contains four blades that extend from the blade rack through apertures in the housing and into the air gaps between the disks of disk stack 102, shown in outline form in FIG. 7. Blade rack 146 contains lower blades 110 while blade rack 148 contains upper blades 112. A rack spring biases each blade rack towards its retracted position. Blade spring 152 biases rack 146 towards the top of the housing, while blade spring 150 biases rack 148 towards the bottom of the housing.

A gear train made up of motor pinion 160, intermediate gear 162, intermediate pinion 164, rack drive gear 166, and rack drive pinion 168 is also located in the housing. Motor pinion 160 is connected to motor shaft 170 of electric motor 180. Motor pinion 160 engages intermediate gear 162. Intermediate pinion 164, which is rigidly connected to intermediate gear 162, engages rack drive gear 166. Finally rack drive pinion 168, which is rigidly connected to rack drive gear 166, engages linear gear race 174 located on rack 120. Rack drive gear 168 contains rack lock bushing 172 which engages solenoid pin 176 of solenoid 190 as explained below. The pinions and gears are mounted on shafts supported by the sides of the housing.

During normal operation of the disk drive, the solenoid is energized and the solenoid pin is extended and engaged in the rack lock bushing. The rack is retracted against the resisting force of rack spring 140 as shown in FIG. 8. The solenoid pin prevents the gear train and motor from moving, and thus keeps the rack in place and holds the rack spring compressed. The blade rack springs hold the blade racks in their retracted positions, keeping the blades between the disk surfaces and the flexures. No power is supplied to the motor at this time. Because the rack is in its retracted position, the plunger is almost entirely within the housing. The plunger thus does not contact the actuator bracket and interfere with the free movement of the actuator arm.

When power to the disk drive is interrupted, the solenoid is no longer energized. A spring return on the solenoid retracts the solenoid pin, allowing free movement of the gear train and rack. The rack spring, which had been compressed, then drives the rack towards the plunger end, extending the plunger out of the housing. The plunger contacts the actuator bracket and moves the actuator arm to the parking zone. When the actuator arm is positioned over the parking zone, an actuator arm stop prevents further movement of the actuator arm, and, consequently, the plunger. The plunger spring then compresses, allowing further movement of the rack. As the rack continues to move, cam surfaces 142 and 144 engage cam follower surfaces 176 and 178 of blade racks 148 and 146 respectively. Cam surface 142 moves blade rack 148 up and cam surface 144 moves blade rack 146 down. As the blade racks move, upper blades 112 move upward against the upper flexures and lift the upper heads upwards off the upper surfaces of the disks. Simultaneously, lower blades 110 move downwards against the lower flexures and lift the lower heads downwards away from the lower surfaces of the disks. In the preferred embodiment, the rack spring extends quickly enough so that the heads are lifted from the disks while the disks are still spinning quickly enough to maintain the air bearing. In this way, the heads never contact the disk. There is little risk of damage to the magnetic heads or to the disks' magnetic surface. A dampening force, in the preferred embodiment produced by the inertia of the gear train and motor, prevents overly abrupt movement of the actuator arm assembly.

The heads are loaded onto the disk when power to the disk drive is turned back on. The motor is turned on, actuating the gear train and retracting the rack. The cam surfaces disengage from the blade racks. The blade springs force the blades to their retracted positions and disengage the blades from the flexures, allowing the magnetic heads to stabilize on the air bearings. The plunger retracts and the actuator arm is free to move. Finally, the solenoid pin engages the rack lock bushing, preventing the gear train from moving and holding the rack in place.

Accordingly, a head lift mechanism for a disk drive assembly has been described. It will be apparent to those skilled in the art that the invention may be practiced without the specific details described above. For example, instead of the plunger, other means may be used to urge the actuator arm towards the parking zone. The head-lift mechanism may be used with a linear as well as a pivoting actuator arm.

We claim:

1. In a disk drive assembly comprising:
   a rotating disk, the disk having a first surface with a storage area for storing data and a parking area;
   a first actuator arm movable over the surface of the disk;
   a first read/write head flexibly attached to the actuator arm;
   an actuator for positioning the actuator arm;
   a head-loading mechanism for automatically placing the head adjacent to and removing it away from the disk surface comprising:
   actuator arm actuating means separate from said actuator for moving the actuator arm so as to position the head in the parking zone;
   head lift means coupled to the actuator arm actuating means for lifting the head away from the disk after the head is positioned in the parking zone;
   power storage means for activating the actuator arm actuating means and the head lift means when power to the disk drive assembly is interrupted; and
   retraction means for disengaging the actuator arm actuating means and head lift means when power to the disk drive assembly is restored such that the head lift means releases the head adjacent to the parking zone and the actuator arm actuating means disengages from the actuator arm, allowing the free movement of the actuator across the disk surface.

2. The head loading mechanism of claim 1 further comprising a mounting means onto which the disk, the actuator, the actuator actuating means, the head lift means, the power storage means, and the retraction means are mounted.

3. The head loading mechanism of claim 2 wherein the actuator arm comprises a pivoting actuator arm.

4. The head loading mechanism of claim 3, wherein the actuator arm actuating means comprises an extendible plunger mounted to the mounting means and a bracket attached to the actuator arm, such that as the plunger extends, it interacts with the bracket and moves the actuator arm so as to position the head adjacent in the parking zone.

5. The head loading mechanism of claim 4 wherein the head is attached to the actuator arm by a first flexure, the flexure comprising a flexible member one end of which is attached to the actuator arm and a second end of which carries the head, the flexure biasing the head towards the disk.

6. The head loading mechanism of claim 5 wherein the head lift means comprises:
   a first blade means located adjacent to the disk, the blade means being positioned such that when the actuator arm is moved such that the head is in the parking zone, the blade means is positioned between the flexure and the disk surface, the blade means being movable towards the flexure;
   a first blade positioning means connected to the blade means and movable under the influence of the power storage means, such that when power to the disk drive is interrupted, the power storage means causes the blade positioning means to move the blade means towards the flexure, engaging the flexure and lifting the head away from the disk surface.

7. The head loading mechanism of claim 6 further comprising a linkage means connecting the power storage means, the blade positioning means, and the plunger means such that when power to the disk drive is interrupted, the power storage means first causes the plunger means to extend, and thereafter causes the blade positioning means to move the head away from the disk surface.

8. The head loading mechanism of claim 7 wherein the power storage means comprises a spring means that exerts a force on the linkage means when power to the disk drive assembly is disconnected such that the plunger extends towards the bracket and the blade moves towards the flexure.

9. The head loading mechanism of claim 8 wherein the linkage means comprises a longitudinal member movable from a retracted to an extended position, the longitudinal member having a first cam surface at a first end, a plunger mounting means for mounting the plunger at a second end, and a power storage means engagement means for engaging the power storage means such that upon the disconnection of power from the disk drive the power storage means causes the longitudinal element to move from its retracted position towards its extended position, thereby causing the plunger means to be extended, and wherein the blade positioning means comprises a first cam follower means that is engageable with the cam means on the longitudinal member as the longitudinal member approaches its extended position, the cam means and the cam follower means being positioned such that the cam follower means does not engage the cam means until after the plunger has been fully extended.

10. The head loading mechanism of claim 9 further comprising an actuator arm stop means that prevents continuing movement of the actuator arm and the plunger after the plunger has been extended sufficiently to position the head in the parking area, and wherein the plunger mounting means comprises a spring means that allows the longitudinal member to continue towards its extended position after the actuator arm stop means has prevented further movement of the plunger.

11. The head loading mechanism of claim 10 wherein the retraction means comprises a motor means that propels the longitudinal member from its extended position to its retracted position against the force exerted by the power storage means, and an automatic locking means that maintains the longitudinal member in its retracted position until power to the disk drive is disconnected.

12. The head loading mechanism of claim 11 wherein the motor means comprises an electric motor and a gear train connected to the motor, and wherein the longitudinal rack means comprises linear gear means that engages with the gear train.

13. The head loading mechanism of claim 9 wherein the disk further comprises a second surface having a storage area where data is stored and a parking area where no data is stored, the head loading mechanism further comprising:
- a second actuator arm movable over the second surface of the disk, the second actuator arm being rigidly connected with the first actuator arm;
- a second read/write head attached to the second actuator arm by means of a second flexure, the second flexure comprising a flexible member one end of which is attached to the second actuator arm and a second end of which carries the second head, the second flexure biasing the second head toward the second disk surface;
- a second blade means located adjacent to the disk, the second blade means being positioned such that when the second actuator arm is moved such that the second head is in to the parking zone of the second disk surface, the second blade means is positioned between the second flexure and the second disk surface, the second blade means being movable towards the second flexure;
- a second blade positioning means connected to the second blade means;
- a second cam surface on the longitudinal member adjacent to the first cam surface;
- a second cam follower means on the second blade positioning means engageable with the second cam surface as the longitudinal member approaches its extended position, the first cam means, the second cam means, the cam follower means, and the second cam follower means being positioned such that the first cam means and second cam means simultaneously engage the cam follower and the second cam follower, respectively, as the longitudinal member approaches its extended position, thereby causing the second blade positioning means to move the second blade means towards the second flexure, engaging the second flexure and lifting the second head away from the second disk surface while the first blade means simultaneously lifts the first head away from the first disk surface.

14. In a disk drive assembly having:
- a plurality of disks, each having first and second surfaces, each surface having a storage area and a parking area,
- an actuator arm assembly, having an actuator arm for each surface movable across the surface of the disk;
- a read/write head for each surface; and
- a flexure for each surface, the read/write head for each surface being mounted on a first end of the flexure, the flexure having a second end attached to the actuator arm, the flexure biasing the head towards the surface;
- a head loading mechanism for automatically and simultaneously, for each surface, placing the head adjacent to and removing it away from the surface of the disk comprising:
- actuator arm actuating means for moving the actuator arm assembly so as to simultaneously position the head of each surface within the parking zone of the surface, the actuator arm actuating means having an extendible plunger movable between a retracted and an extended position, the plunger interacting with a bracket attached to the actuator arm such that as the plunger moves towards its extended position it moves the actuator arm assembly so as to position the head within the parking zone;
- first and second blade positioning means located adjacent to the disk assembly, each blade positioning means being movable between a retracted and an extended position;
- a blade means for each surface attached to the first blade positioning means, being positioned such that when the actuator arm assembly is moved such that the head is within the parking zone and the blade positioning means is in its retracted position, the blade means is positioned between the flexure and the surface such that, as the blade positioning means moves from its retracted position towards its extended position, the blade means moves towards the flexure, engaging the flexure and causing the head to be removed away from the surface;
- a power storage means that exerts a force on a linkage member when power to the disk drive is interrupted, the linkage member being connected to the plunger and the first and second blade positioning means such that movement of the linkage member from a retracted to an extended position first moves the plunger to its extended position and subsequently moves the blade positioning means to their respective extended positions; and retraction means that returns the linkage means, the plunger means, and the blade positioning means to their respective retracted positions when power to the disk drive assembly is restored, thereby disengaging the blade means from the flexures, causing the heads to be placed within the parking zones of the disk surfaces, and subsequently disengaging the plunger from the bracket, releasing the actuator arm assembly and allowing the actuator arms to move freely over the disk surfaces.

15. The head loading mechanism of claim 14 wherein the power storage means comprises a spring means that exerts a force on the linkage means when power to the disk drive assembly is disconnected.

16. The head loading mechanism of claim 15 wherein the linkage means comprises a longitudinal member movable from a retracted to an extended position, the longitudinal member having a cam surface at a first end, a plunger mounting means for mounting the plunger at a second end, and a power storage means engagement means for engaging the power storage means such that upon the disconnection of power from the disk drive the power storage means causes the longitudinal element to move from its retracted position towards its extended position, thereby causing the plunger means to be extended, and wherein the first and second blade positioning means comprise first and second cam follower means that are engageable with first and second cam means on the longitudinal member as the longitudinal member approaches its extended position, the cam means and the cam follower means being positioned such that the cam follower means do not engage the cam means until after the plunger has been fully extended.

17. The head loading mechanism of claim 16 further comprising an actuator arm stop means that prevents continuing movement of the actuator arm assembly and the plunger after the plunger has been extended sufficiently to position the head within the parking zone, and wherein the plunger mounting means comprises a spring means that allows the longitudinal member to continue towards its extended position after the actuator arm stop means has prevented further movement of the plunger.

18. The head loading mechanism of claim 17 wherein the retraction means comprises a motor means that propels the longitudinal member from its extended position to its retracted position against the force exerted by the power storage means, and an automatic locking means that maintains the longitudinal member in its retracted position until power to the disk drive is disconnected.

19. The head loading mechanism of claim 18 wherein the motor means comprises an electric motor and a gear train connected to the motor, and wherein the longitudinal rack means comprises linear gear means that engages with the gear train.

20. The head loading mechanism of claim 14 wherein the retraction means comprises a dampening means that controls the speed at which the linkage member causes the plunger and the blade positioning means to be moved towards their respective extended positions under the influence of the force exerted by the power storage means.

21. The head loading mechanism of claim 14 wherein the dampening means comprises a gear train.

22. In a disk drive assembly comprising:
a mounting means;
a rotating disk, the disk having a first surface with a storage area for storing data and a parking zone;
a first actuator arm movable over the surface of the disk comprising a pivoting actuator arm; and
a first read/write head flexibly attached to the actuator arm;
a head-loading mechanism for automatically placing the head adjacent to and removing it away from the disk surface comprising:
actuator arm actuating means for moving the actuator arm so as to position the head in the parking zone comprising an extendable plunger mounted to said mounting means and a bracket attached to the actuator arm, such that as the plunger extends, it interacts with the bracket and moves the actuator arm so as to move the head to the parking zone.
head lift means coupled to the actuator arm actuating means for lifting the head away from the disk after the head is positioned in the parking zone;
power storage means for activating the actuator arm actuating means and the head lift means when power to the disk drive assembly is interrupted; and
retraction means for disengaging the actuator arm actuating means and head lift means when power to the disk drive assembly is restored such that the head lift means releases the head adjacent to the parking zone and the actuator arm actuating means disengages from the actuator arm, allowing the free movement of the actuator across the disk surface; with
the disk, the actuator arm, the actuator actuating means, the head lift means, the power storage means, and the retraction means mounted onto said mounting means.

23. The head loading mechanism of claim 22 wherein the head is attached to the actuator arm by a first flexure, the flexure comprising a flexible member one end of which is attached to the actuator arm and a second end of which carries the head, the flexure biasing the head toward the disk.

24. The head loading mechanism of claim 23 wherein the head lift means comprises:
a first blade means located adjacent to the disk, the blade means being positioned such that when the actuator arm is moved such that the head is in the parking zone, the blade means is positioned between the flexure and the disk surface, the blade means being movable toward the flexure;
a first blade positioning means connected to the blade means and movable under the influence of the power storage means, such that when power to the disk drive is interrupted, the power storage means causes the blade positioning means to move the blade means toward the flexure, engaging the flexure and lifting the head away from the disk surface.

25. The head loading mechanism of claim 24 further comprising a linkage means connecting the power storage means, the blade positioning means, and the plunger means such that when power to the disk drive is interrupted, the power storage means first causes the plunger means to extend, and thereafter causes the blade positioning means to move the head away from the disk surface.

26. The head loading mechanism of claim 25 wherein the power storage means comprises a spring means that exerts a force on the linkage means when power to the disk drive assembly is disconnected such that the plunger extends toward the bracket and the blade moves toward the flexure.

27. The head loading mechanism of claim 26 wherein the linkage means comprises a longitudinal member movable from a retracted to an extended position, the longitudinal member having a first cam surface at a first end, a plunger mounting means for mounting the plunger at a second end, and a power storage means engagement means for engaging the power storage means such that upon the disconnection of power from the disk drive the power storage means causes the longitudinal element to move from its retracted position toward its extended position, thereby causing the plunger means to be extended, and wherein the blade positioning means comprises a first cam follower means that is engageable with the cam means on the longitudinal member as the longitudinal member approaches its extended position, the cam means and the cam follower means being positioned such that the cam follower means does not engage the cam means until after the plunger has been fully extended.

28. The head loading mechanism of claim 27 further comprising an actuator arm stop means that prevents continuing movement of the actuator arm and the plunger after the plunger has been extended sufficiently to position the head in the parking area, and wherein the plunger mounting means comprises a spring means that allows the longitudinal member to continue toward its extended position after the actuator arm stop means has prevented further movement of the plunger.

29. The head loading mechanism of claim 28 wherein the retraction means comprises a motor means that propels the longitudinal member from its extended position to its retracted position against the force exerted by the power storage means, and an automatic locking means that maintains the longitudinal member in its retracted position until power to the disk drive is disconnected.

30. The head loading mechanism of claim 29 wherein the motor means comprises an electric motor and a gear train connected to the motor, and wherein the longitudinal rack means comprises linear gear means that engages with the gear train.

31. The head loading mechanism of claim 27 wherein the disk further comprises a second surface having a storage area where data is stored and a parking area where no data is stored, the head loading mechanism further comprising:
a second actuator arm movable over the second surface of the disk, the second actuator arm being rigidly connected with the first actuator arm;
a second read/write head attached to the second actuator arm by means of a second flexure, the second flexure comprising a flexible member one end of which is attached to the second actuator arm and a second end of which carries the second head, the second flexure biasing the second head toward the second disk surface;
a second blade means located adjacent to the disk, the second blade means being positioned such that when the second actuator arm is moved such that the second head is in the parking zone of the second disk surface, the second blade means is positioned between the second flexure and the second disk surface, the second blade means being movable towards the second flexure;
a second blade positioning means connected to the second blade means;
a second cam surface on the longitudinal member adjacent to the first cam surface;
a second cam follower means on the second blade positioning means engageable with the second cam surface as the longitudinal member approaches its extended position, the first cam means, the second cam means, the cam follower means, and the second cam follower means being positioned such that the first cam means and second cam means simultaneously engage the cam follower and the second cam follower, respectively, as the longitudinal member approaches its extended position, thereby causing the second blade positioning means to move the second blade means towards the second flexure, engaging the second flexure and lifting the second head away from the second disk surface while the first blade means simultaneously lifts the first head away from the first disk surface.

* * * * *